United States Patent [19]

McCorkle

[11] Patent Number: 4,759,894
[45] Date of Patent: Jul. 26, 1988

[54] METHOD AND APPARATUS FOR PRODUCING AN ULTRA-HIGH CONTROLLED TRANSIENT TEMPERATURE WITH AN ELECTRICAL DISCHARGE

[75] Inventor: Richard A. McCorkle, South Salem, N.Y.

[73] Assignee: International Business Machines Corporation, Armonk, N.Y.

[21] Appl. No.: 922,630

[22] Filed: Oct. 24, 1986

Related U.S. Application Data

[63] Continuation of Ser. No. 795,160, Nov. 5, 1985, abandoned, which is a continuation of Ser. No. 460,740, Jan. 25, 1983, abandoned.

[51] Int. Cl.$^4$ .............................................. G21B 1/00
[52] U.S. Cl. .................................................. 376/144
[58] Field of Search ............... 376/100, 102, 122, 144, 376/145

[56] References Cited

U.S. PATENT DOCUMENTS

| | | | |
|---|---|---|---|
| 3,935,504 | 1/1976 | Guillaneux et al. | 376/145 |
| 4,023,065 | 5/1977 | Koloc | 376/144 |
| 4,152,625 | 5/1979 | Conrad | 376/100 |
| 4,182,650 | 1/1980 | Fischer | 376/144 |
| 4,182,651 | 1/1980 | Fischer | 376/144 |

OTHER PUBLICATIONS

"Controlled Nuclear Fusion: Current Research and Potential Progress", p. 36, 1978.
Glasstone et al., *Controlled Thermonuclear Reactions*, Van Nostrand Co., Inc., 1960, p. 10.
Zakharov et al., "Soft X-ray Emission in a High-Current Capillary Discharge", Sov. Tech. Phys. Lett., vol. 6, No. 9, pp. 486–487, 1980.
Konia et al., "Diagnostics of a High Current Capillary Discharge", Conf. on Dense Z-Pinches for Fusion, 1984.

*Primary Examiner*—Deborah L. Kyle
*Assistant Examiner*—Richard L. Klein
*Attorney, Agent, or Firm*—Thomas P. Dowd

[57] ABSTRACT

An intense electrical discharge along the axis of a capillary having condensed phase (liquid or solid) walls produces a controlled transient plasma temperature of 10 million degrees Kelvin or more. In order to reach such a temperature, the capillary is formed with a suitably small diameter and a sufficiently large aspect ratio and the electrical discharge must have a suitably short risetime and a sufficient high intensity. In the preferred embodiment, the capillary walls comprise thermonuclear fusible material, the plasma temperature reaches at least 60 million degrees Kelvin, and the density-time product is sufficient to produce a useful thermonuclear fusion reaction. The ultra-high temperature capillary discharge can be used as a pulsed source of nuclear and/or x-ray radiation or as a pulsed nuclear fusion reactor.

32 Claims, 4 Drawing Sheets

METHOD AND APPARATUS FOR PRODUCING AN ULTRA-HIGH CONTROLLED TRANSIENT TEMPERATURE WITH AN ELECTRICAL DISCHARGE

This is a continuation of application Ser. No. 795,160, filed Nov. 5, 1985, which, in turn, was a continuation of application Ser. No. 460,740, filed Jan. 25, 1983, both now abandoned.

DESCRIPTION

1. Technical Field

This invention generally relates to high power electrical discharge apparatus and more specifically to electrical discharge apparatus for producing a transient temperature of at 10 million degrees Kelvin. It also particularly relates to thermonuclear fusion reactors.

2. Background Art

It has long been known that the temperature within an electrical discharge is high and that electromagnetic energy is radiated thereby. Many electromagnetic radiation sources (both pulsed and continuous) rely directly upon this effect to generate the desired radiation. Electrical discharges have also been used to produce a high local temperature for heat treatment or for producing a chemical effect. Electric arc welding, for example, is based upon this effect. It is also known that as the temperature of the plasma produced by the discharge increases, the wavelength decreases (assuming the same plasma composition) and the intensity of the radiation increases.

The highest temperature heretofore produced with a confined electrical discharge is believed to be reported by S. Zakharov et al in an article entitled "Soft x-ray emission in a high-current capillary discharge," Sov. Tech. Phys. Lett., Vol. 6, No. 9, pages 486–487 (1980). The electron temperature of the plasma was reported to be 150–200 eV, which corresponds to about 2 million degrees Kelvin and produces a radiation in the soft x-ray region. The article suggests that by using a faster rising electrical pulse and a lower impedance transmission line for delivering the electrical pulse, even higher temperatures can be achieved. Analysis reveals that the current flow in the reported configuration was already limited by the discharge rather than by the current delivery apparatus. Accordingly, the current flow and the resulting temperature would not be increased significantly by these improvements.

A still higher electrical discharge plasma temperature of 10 million degrees Kelvin or more is desirable because radiation would be produced thereby which is not very easily or economically produced by other methods. Transient ultra-high temperatures in this range also could be used to support or initiate ultra-high temperature chemical reactions which are not possible today. The shock wave produced by such a discharge might be used to induce shock wave chemical reactions.

Hard x-ray radiation would be produced by a plasma temperature of 10 million degrees Kelvin or more. At 10 million degrees Kelvin, the temperature is also high enough to allow certain thermonuclear reactions to occur (albeit inefficiently), thereby resulting in liberation of some high energy neutrons. A convenient, portable and inexpensive source of high energy neutrons is not available today. At a plasma temperature of 60 million degrees Kelvin or more, certain thermonuclear reactions could be supported efficiently.

A practical method and apparatus for supporting a controlled (i.e., self-extinguishing) thermonuclear fusion reaction (unlike the uncontrolled self-supporting one produced by a fusion bomb) promises cheap, clean and virtually unlimited power generation, and has been sought for decades. A useful thermonuclear fusion reaction rate occurs when a plasma is formed with suitable constituents at a temperature and density which are both suitably high and such conditions are maintained for a sufficiently long time. A plasma temperature of at least 60 million degrees Kelvin is required, which is very difficult to generate. Still more difficult to overcome is the tendency for a plasma having such a high temperature to expand, thereby lowering the plasma density and temperature so much and so quickly that a useful thermonuclear reaction rate (cross section) tends thereby to be avoided. The temperature required is so high that no physical container can withstand such temperature without vaporizing.

Early attempts were made to use an electrical discharge to produce a suitably high temperature and to rely upon self-induced magnetic fields to contain the plasma sufficiently to achieve the required density-time product for a useful thermonuclear burn. Such work is reported, for example, in the following articles:

R. S. Pease, "Equilibrium Characteristics of a Pinched Gas Discharge Cooled by Bremsstrahlung Radiation", Proc. Phys. Soc., Vol. B70, p.11 (1957);

S.I. Braginskii, "The Behavior of a Completely Ionized Plasma In A Strong Magnetic Field", Soviet Physics JETP, Vol. 6(33), p.494 (1958);

H. Alfven et al, "Gas-Insulation of a Hot Plasma", Nature, Vol. 188, p.801 (Dec. 3, 1960);

C-G. Flathammar, "Stationary State of a High-Temperature Gas-Insulated Plasma Column", Phys. Fluids, Vol. 4, p.1145 (1961);

E. A. Smars et al, "Toroidal High-Pressure Discharge Experiment", Phys. Fluids, Vol. 4, p.1151 (1961);

E. A. Smars, "Experiment on a high-current discharge at a atmospheric pressure", Phys., Vol. 29, p.97 (1964);

L. A. Jones et al, "A laser-initiated, gas-embedded Z Pinch; experiment and computation", Appl. Phys. Lett., Vol. 38, p.522 (1981);

All such attempts failed to produce suitable thermonuclear reaction conditions, so attention gradually turned for containment of a thermonuclear plasma to the use of externally generated electrical and/or magnetic fields and/or externally generally beams (laser, ion or electron beams). Past techniques for forming suitable conditions for a controlled thermonuclear fusion reaction have generally relied upon externally generated beams and/or externally generated fields to contain the plasma. Unfortunately, generation of the extreme temperature and pressure required to support a useful thermonuclear fusion reaction using externally generated beams or fields requires so much energy that a net gain in energy from the thermonuclear fusion process has remained elusive.

An object of this invention is to produce a controlled thermonuclear fusion reaction without using externally supplied fields or beams to confine the reaction plasma.

It is also an object of this invention to produce a useful thermonuclear fusion reaction using an electrical current discharge.

Another object is to provide a compact, inexpensive and portable thermonuclear fusion reactor.

It is a further object to provide a thermonuclear fusion reactor which produces more useful energy than it requires to operate.

Still another object is to provide a convenient compact, portable and inexpensive source of high energy nuclear particles.

It is also an object of this invention to provide a source of hard x-ray radiation using an electrical discharge.

A further object is to provide suitable conditions for ultra-high temperature chemical reactions and for shock wave chemistry.

Another object is to produce a transient temperature of at least 10 million degrees Kelvin and preferably at least 60 million degrees Kelvin with an electrical discharge.

DISCLOSURE OF THE INVENTION

Figure 1:
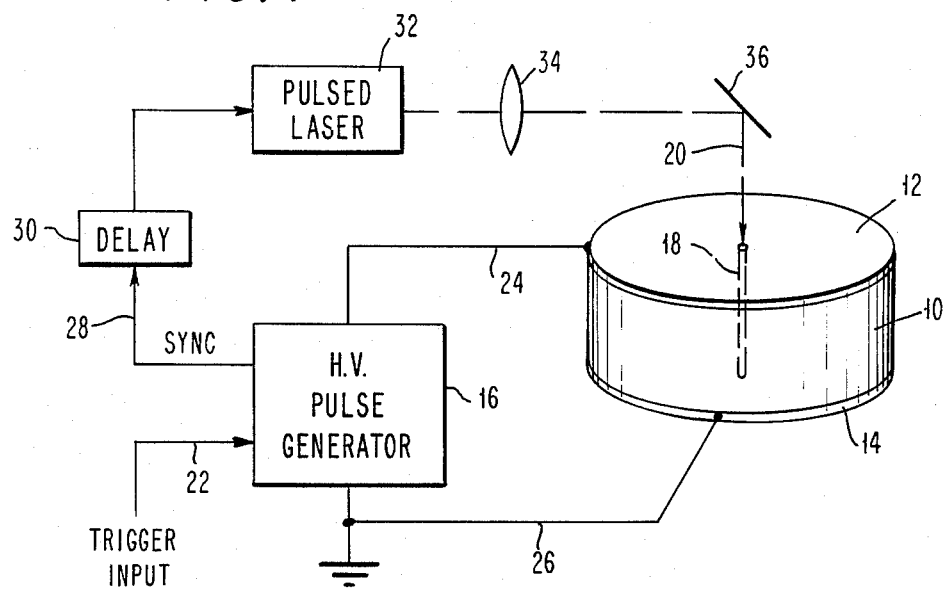
FIG. 1 schematically illustrates capillary discharge apparatus in accordance with this invention.

It has been discovered that when the current of an electrical discharge through a capillary having condensed phase (liquid or solid) walls is limited by the discharge itself rather than by the system delivering current to the capillary, the temperature of the plasma formed by the discharge may be increased remarkably by reducing the capillary diameter and by increasing the capillary aspect ratio (length divided by diameter). When the capillary diameter is sufficiently small and the capillary aspect ratio is sufficiently large, a high power electrical discharge through the capillary will produce transient plasma temperatures heretofore considered unattainable with a capillary discharge.

Using this technique, a plasma temperature of 10 million degrees Kelvin may be easily obtained and plasma temperatures as high as a few hundred million degrees Kelvin appear to be feasible.

At an extremely high temperature, nucleii of atoms can have a sufficient energy that collisions (or near collisions) between nucleii can occur which result in a rearrangement of nuclear consitutents and a release of energy. Such a reaction is called a thermonuclear reaction because extremely high temperature is required to overcome the Coulomb (charge repulsion) barrier. Since the temperature required for such reactions increases rapidly with nuclear charge, the thermonuclear reactions of particular interest involve isotopes of the lighter elements, mainly hydrogen, helium and lithium. In these reactions, a heavier nucleus is formed by the union of nuclear parts from two lighter nucleii. Accordingly, such reactions are called fusion reactions.

Of the many possible thermonuclear fusion reactions which may occur with or between isotopes of lighter elements, only a few can be made to occur at a sufficiently high rate (known as the cross section) to permit a practical gain of energy at a temperature considered to be reasonably attainable. Among these are two deuterium-deuterium reactions (one liberating a proton and producing tritium, and the other one liberating a neutron and producing helium-3 or $^3$He), the deuterium-tritium reaction (liberating a neutron and producing helium-4 or $^4$He), the tritium-tritium reaction (liberating two neutrons and producing $^4$He), and the deuterium-$^3$He reaction (liberating a proton and producing $^4$He). In a typical fusion process fueled by deuterium all of these reactions occur to some extent. A more detailed description of fusion reactions may be found, for example, in CONTROLLED THERMONUCLEAR REACTIONS BY S. Glasstone and R. H. Lovberg (Van Nostrand, 1960), and in F. L. Ribe, "Fusion Reactor Systems," Rev. Mod. Phys., Vol. 47, 7 (1975), both of which are hereby fully incorporated by reference.

A transient thermonuclear fusion reaction may be produced within a capillary having condensed phase walls by making the diameter of the capillary sufficiently small and the capillary aspect ratio sufficiently large. The capillary walls are formed partially or totally of suitable thermonuclear fusible material such as deuterium and/or tritium and a suitably intense and suitably fast rising electrical pulse is discharged along the axis of the capillary. If the electrical discharge has a sufficiently fast current rise and a sufficient amplitude and the capillary has a sufficiently small diameter and a sufficiently large aspect ratio, a plasma containing thermonuclear fusible material is produced within the capillary at a temperature and with a density-time product sufficient to produce a useful transient thermonuclear fusion reaction.

The thermonuclear reaction is inherently self-extinguishing because of the expansive nature of the burn.

Heretofore, the possibility of using a condensed phase material to contain a plasma heated to a thermonuclear reaction temperature (60 million degrees Kelvin or higher) was not considered. One possible reason for not even considering a condensed phase material as a possible containment vessel for such a plasma is that no condensed phase material can withstand a temperature even several orders of magnitude lower than this. All condensed phase materials vaporize at a temperature far below 60 million degrees Kelvin.

Another reason for not even considering a condensed phase material as a containment vessel for a thermonuclear reaction is that condensed phase materials all conduct heat rapidly compared with a gaseous or vacuum phase. Since the rate at which heat flows increases proportionally with the temperature gradient, it would appear that a temperature of 60 million degrees Kelvin or more on one side of a condensed phase wall would produce a heat flow through the condensed phase wall which is so great that such a temperature could not be attained within a condensed phase containment vessel, even if the condensed phase material were to somehow avoid becoming vaporized. Presumably as a result of these two considerations, the use of a solid phase containment vessel for a thermonuclear reaction was heretofore generally considered impossible.

The events which occur during a high power electrical discharge through a capillary also heretofore have been greatly misunderstood. Since an enormous heat flow through the condensed phase walls does not occur, it has been assumed by others (e.g., S. Zakharov et al. cited previously) that the self-magnetic field of the discharge must be detaching the plasma from the capillary walls and radially compressing it along the axis of the capillary. A reduction in the diameter of the capillary presumably would have no beneficial effect if the plasma actually detaches from the capillary walls. To the contrary, a reduction in the diameter of the capillary might instead be expected to decrease the thermal isolation between a detaching and radially compressing plasma and tend to increase thermal conduction through the capillary walls. A very small diameter for the capillary might be expected even to result in no plasma detachment from the capillary wall at all.

It has been discovered, however, that a very small diameter capillary produces a higher (not a lower) transient temperature for the plasma. The effects which take place during a high power electrical discharge through a capillary are now much better understood and do not involve any detachment of a plasma from the capillary walls. It has been found that a plasma temperature as high as 100 million degrees Kelvin or higher can be formed by establishing an intense electrical discharge through a capillary having condensed phase walls by making the capillary diameter sufficiently small, the capillary aspect ratio sufficiently large and the electrical discharge sufficiently intense and sufficiently quickly rising.

It has been discovered that when an intensely hot plasma is formed quickly enough by a capillary discharge a shock wave is formed which overtakes the heat conduction wavefront. Three phases are formed. Ahead of the shock front, the condensed phase material is undisturbed and, except for radiation effects, unheated by the discharge. Along and just behind the shock front, a strongly coupled plasma is formed having a density several times the density of the undisturbed condensed phase material. Behind the strongly coupled plasma at the wall is a much hotter and considerably less dense plasma, which fills the core of the capillary. As the dense strongly coupled wall plasma moves radially outward, material is ablated from the capillary walls by the wall plasma, which in turn contributes plasma material to the hotter core plasma behind the wall plasma. The strongly coupled wall plasma actually protects or insulates the capillary walls from the much higher temperature of the core plasma. At the same time, the strongly coupled wall plasma inherently resists expansion so that it physically assists the capillary walls in containing the very hot core plasma. Containment of the hot core plasma is further aided by a very intense self-magnetic field generated by the intense electrical discharge. The self-magnetic field of the discharge not only resists flow of the plasma radially outward but also resists convective heat flow outward. These physical processes are described in much greater detail in a report by R. A. McCorkle entitled "Outline For A Capillary Discharge Thermonuclear Burner," IBM Research Report RC 9209, which is publicly available from the IBM Thomas J. Watson Research Center, Distribution Services 38-066, Post Office Box 218, Yorktown Heights, N.Y. 10598, and which is hereby fully incorporated by reference. This report will also be available shortly as an article published in the journal, Nuovo Cimento.

In accordance with the present invention, the condensed phase capillary walls are preferably composed of material which contains (and preferably is principally composed of) thermonuclearly fusible material. Fusible material is ablated from the capillary walls by the wall plasma and deposited into the core plasma. Since the deuterium-tritium nuclear fusion reaction proceeds at a lower temperature than any other known fusion reaction, it is advantageous for the core plasma to contain both dueterium and tritium. If both deuterium and tritium are present in the plasma, a fusion reaction can be established more easily, more quickly and presumably more efficiently. Once established, the fusion reaction helps to heat the plasma and produces nuclear particles and by-products for use in other fusion reactions. If the capillary is formed before the discharge is established, it may contain a gas (or liquid in theory). The capillary could be filled with a gas containing tritium, for example, while the capillary walls contain deuterium. The two then would combine in the core plasma to form the desired deuterium-tritium mixture. When the core plasma reaches about 60 million degrees Kelvin, a useful thermonuclear reaction occurs.

A short time after an intense capillary discharge is initiated, the resulting shock wave expands the capillary sufficiently that thermonuclear reaction conditions cannot be maintained and the thermonuclear reaction automatically extinguishes. In order to maximize the period of time during which thermonuclear reaction conditions exist, the discharge should preferably be initiated in a capillary which has a diameter as small as possible. To reduce the adverse effect of plasma leaking out from the ends of the capillary, the capillary also preferably should be as long as possible, the maximum length of the capillary (as well as the maximum diameter of the capillary) being limited ultimately by the voltage and current characteristics of the discharge pulse which can be conveniently delivered to the capillary.

The maximum temperature $T_{max}$ in electron volts which can be reached by the plasma is related to the diameter and the aspect ratio of the capillary as follows:

$$T_{max} \simeq (9/8D^{\frac{1}{2}})(A^{\frac{1}{2}}Z\Lambda L/D)^{\frac{1}{2}}$$

where D is the diameter of the capillary at the time maximum plasma temperature is reached, L is the length of the capillary, L/D is the aspect ratio of the capillary, A is the atomic weight (weighted average) of the core plasma, Z is the average ionic charge of the core plasma and $\Lambda$ is the Coulomb logarithm (which is usually about 10). In practice, the diameter and length of the initial capillary are selected such that the desired maximum plasma temperature can be achieved in accordance with this formula. A slightly smaller actual diameter is selected for the capillary than the diameter required by this formula because the capillary diameter will expand slightly before maximum plasma temperature is achieved.

Although it would appear from the above formula that any maximum temperature could be reached simply by making the capillary diameter arbitrarily small, this is not true in practice. As will be apparent from a later equation, as the diameter becomes smaller, the minimum density for the capillary walls increases. The density of the capillary walls (and incidentally the discharge voltage) determines the minimum capillary diameter at the time maximum temperature is reached. If a much smaller diameter initial capillary is used, presumably the maximum plasma temperature will not be reached until the capillary has expanded to about this minimum diameter.

For a 10 million ° K. plasma the diameter of the capillary can be as large as about 250 $\mu$m, though a smaller capillary diameter would be preferred, such as about 50 $\mu$m. For a 60 million ° K. plasma, the diameter of the capillary can be as large as about 50 μm, though a smaller diameter would be preferred, such as about 10 μm. Once the maximum plasma temperature and the diameter are selected, the aspect ratio may be found from the above equation. Alternatively, the maximum plasma temperature and aspect ratio may be selected and the required diameter determined from this formula. In accordance with this invention, the aspect ratio should be sufficiently high that the plasma escaping from the ends of the capillary does not have an unacceptable detrimental effect. It is expected that a minimum aspect ratio of about 100 should be used with a higher aspect ratio of about 1000 or more being preferred.

Once the diameter and aspect ratio of the capillary are selected, the requirements for the electrical pulse supplying the discharge can be determined. The aim is to make the discharge itself limit the current being supplied to the discharge. The desired density-time product is first selected. For a useful fusion reaction, the density-time product must satisfy the Lawson criteria, which requires a density-time product of about $10^{14}$ particle seconds per cubic centimeter or higher. For other applications the density-time product may be smaller, though a high density-time product will improve the energy output of the discharge.

Once the required density-time product is selected, the minimum voltage to be maintained during the discharge can be determined from the following expression:

$$\eta T \simeq \frac{2 \cdot 10^7 \, V^2 A}{Z\Lambda(T_{max})^{\frac{1}{2}}}$$

where $\rho Y$ is the density-time product in particle seconds per cubic centimeter, V is the minimum voltage to be maintained during the discharge in volts, $T_{max}$ is the maximum plasma temperature, Z is the average ionic charge of the core plasma, and $\Lambda$ is the coulomb logarithm. Typically the voltage will be at least 10 kilovolts and preferably at least 40 kilovolts. A voltage as high as several million volts is available from commercially sold high power pulse discharge equipment and can be used.

Once the voltage has been selected, the minimum current which should be supplied to the discharge can be determined from the following expression:

$$I = (\pi/4)(V/L)D^2 \sigma$$

where $\sigma$ is the conductivity of the plasma, D is the diameter of the capillary at maximum plasma temperature, L is the length of the capillary, and V is the voltage maintained across the discharge. $\sigma$ is given by the following expression:

$$\sigma \simeq \frac{10^2 (T_{max})^{3/2}}{Z\Lambda}$$

where $T_{max}$ is the maximum plasma temperature, Z is the ionic charge (weighted average) of the core plasma, and $\Lambda$ is the Coulomb logarithm. Typically the current will be more than 50 kiloamps.

The rate at which current required by the discharge should rise is determined by the following expression:

$$\frac{dI}{dt} \simeq \frac{10^9 \, V}{3 \, L}$$

Where dI/dt is the time rate of change of the current supplied to the discharge in amperes per second, V is the voltage maintained across the discharge in volts, and L is the length of the capillary in centimeters. The required current will rise at this rate to the value I previously determined. This corresponds to a rise time in the range of about 10 nanoseconds or less for less intense pulses to about 200 nanoseconds or more for more intense pulses.

The previous expressions were all derived on the assumption that a sufficient power loading on the capillary walls has been achieved so that the three phase behavior previously described will occur. In order to assure that a sufficient power loading occurs the following expression also should be satisfied:

$$\frac{IV}{\pi DL} > 10^9 \text{ watts/cm}^2$$

where all the variables have been previously defined. In addition, the density $\rho$ of the capillary walls must satisfy the following condition:

$$\rho > \frac{1.3 \, V^2 A^2}{10^{10} \, T_{max}^2 \, D^2}$$

where V is in volts, D is in centimeters, $T_{max}$ is in electron volts, and $\rho$ is in grams per cubic centimeter. As stated earlier, this expression effectively limits the minimum diameter of the capillary at the maximum plasma temperature.

The plasma in the capillary rises to a maximum temperature and then falls again as the expansion of the capillary diameter and leakage of plasma from the capillary ends overtake the rising electrical powre input. In order to assure that the electrical pulse lasts long enough to supply the discharge while the ultra-high temperature conditions exist, the pulse should last in nanoseconds at least $300(A/T_{max})^{\frac{1}{2}}$ times the length of the capillary in centimeters, with $T_{max}$ in electron volts. The maximum time during which thermonuclear reaction conditions can be maintained is probably no more than about 1000 nanoseconds.

The following set of parameters, for example, provides a 60 million degree Kelvin plasma temperature with a density-time product of $10^{14}$ particle-seconds/cm$^3$, which is suitable for a useful thermonuclear reaction to occur with a dueterium-tritium plasma:

V≃40,000 volts
I≃88,000 amperes
L≃1.54 cm
D≃11 μm
Risetime≃$10^{-8}$ seconds
Pulse Duration≃$10^{-8}$ seconds In order to get at least 40,000 volts during a discharge from a parallel plate storage capacitor discharged at the center and supplying this current requires an initial charge of about 290,000 volts. The discharge will require about 260 Joules of stored energy and consume $2.6 \times 10^{10}$ watts of power. Apparatus which can supply such a high power pulse is readily available, for example, from Maxwell Laboratories, Inc., 8835 Balboa Ave., San Diego, Calif. 92123. Much more powerful pulse sources are also available from Maxwell Laboratories and others.

The following set of parameters, for example, provides a 10 million degree Kelvin hydrogen plasma temperature with a density-time product of $10^{13}$ particle-seconds/cm$^3$, which is suitable for use as a hard x-ray source:

$V \simeq 12,500$ volts
$I \simeq 74,000$ amperes
$L \simeq 1.5$ cm
$D \simeq 67$ μm
Risetime $\simeq 2.7 \times 10^{-8}$ seconds
Pulse Duration $\simeq 2.2 \times 10^{-8}$ seconds A more efficient thermonuclear burn is achieved at the density-time product corresponding to ignition which for deuteriumtritium is $10^{15}$ particle-seconds/cm$^3$. The following set of parameters, for example, provides a density-time product of $10^{15}$ particle-seconds/cm$^3$ at 60 million degrees Kelvin:

$V \simeq 130,000$ volts
$I \simeq 280,000$ amperes
$D \simeq 35$ μm
$L \simeq 15.4$ cm
Risetime $\simeq 10^{-7}$ seconds
Pulse Duration $\simeq 10^{-7}$ seconds.

The initial voltage charge required on a storage capacitor to supply such a pulse upon discharge is about 900,00 volts, Equipment which can provide such a pulse is available from Maxwell Laboratories, for example, and others.

BEST MODE FOR CARRYING OUT THE INVENTION

Referring now to FIG. 1, a condensed phase material 10 is generally shown sandwiched between two electrodes 12, 14. Electrodes 12, 14 function to briefly store electrical charge received from high voltage generator 16 so that it can be delivered quickly to a discharge along capillary 18. The discharge along capillary 18 is initiated with a laser pulse 20. A trigger input along line 22 causes high voltage pulse generator 16 to deliver an intense electrical pulse to plates 12, 14 along lines 24, 26. A sync pulse is delivered at the same time along line 28 to a time delay element 30. The delayed sync pulse in turn triggers a pulsed laser 32 to deliver a light pulse via lens 34 and mirror 36 to the capillary 18. The amount of time delay introduced by element 30 is selected such that the high voltage pulse from generator 16 has had time to substantially charge plates 12, 14 before the light pulse triggers an electrical discharge through the capillary 18.

Figure 2:
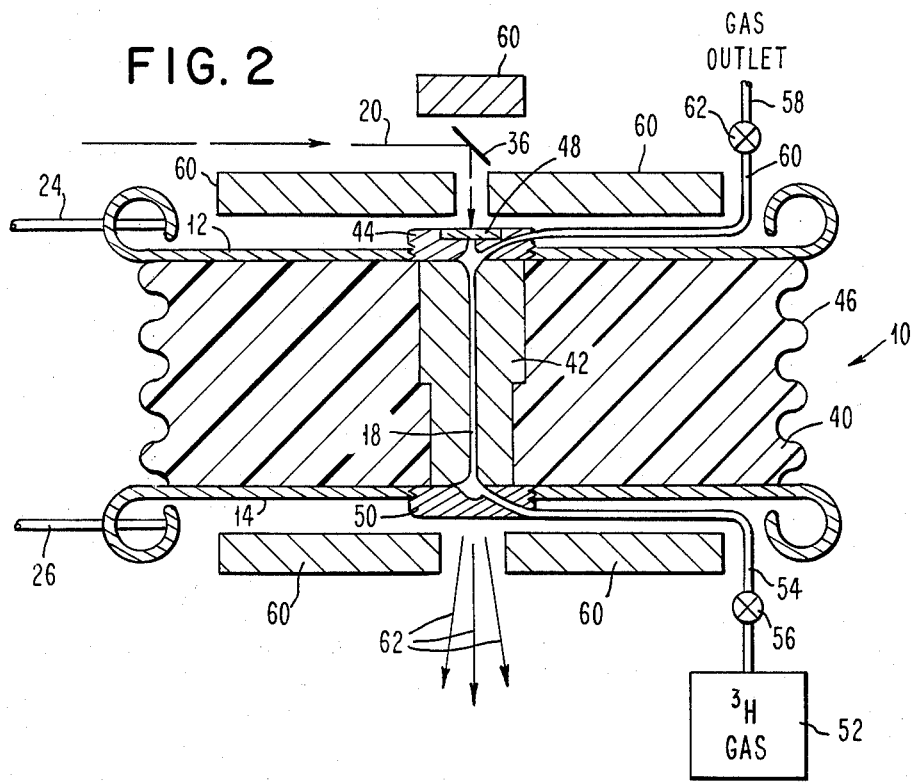
FIG. 2 is a cross-sectional illustration of a capillary discharge unit wherein the capillary is formed within a solid phase material containing fusion reaction constituent(s).

FIG. 2 illustrates in more detail a capillary discharge apparatus such as is generally shown in FIG. 1 but which is adapted for creating a thermonuclear reaction by forming the capillary walls partly or completely of fusible material. The condensed phase material 10 comprises an outer permanent portion 40 and an inner replaceable sleeve portion 42. It is contemplated that the inner sleeve 42 will be replaced after each discharge. The outer portion 40 is needed to hold the sleeve portion 42 and to give additional mechanical support during the discharge. The material for the outer portion 40 is selected such that it not only has a suitable mechanical elasticity but also a suitable dielectric constant. Plates 12, 14 act as a capacitor. Since maximum charge storage is desired, a high dielectric constant for the material of spacer 40 is also desirable. The diameter of the plates 12, 14 and the dielectric constant of spacer 40 are selected such that a sufficient charge can be stored. With a solid condensed phase material, the diameter of the plates probably would be on the order of a meter or more.

Sleeve 42 contains thermonuclear fusible material such as deuterium. A suitable material for sleeve 42, for example, is deuterated polyethylene. A suitable material for spacer 40 is mylar, for example.

Sleeve 42 may be replaced by removing threaded cap 44. A tight fit between sleeve 42 and outer portion 40 may be assured by slightly oversizing the sleeve 42, freezing the sleeve 42 in liquid nitrogen, for example, and then inserting the freeze shrunk sleeve into the outer part 40. Standard high voltage and high energy pulse practices are observed. The outer walls 46 of the spacer 40 are curved in serpentine fashion to avoid a discharge along that surface. The ends of plates 14, 16 are curled away from the spacer also to prevent an inadvertent discharge. The outer surface of sleeve 42 is stepped to reduce the chance of an inadvertent discharge along the interface between the spacer 40 and the sleeve 42. Top cap 44 carries a replaceable window 48 for admitting laser pulse 20.

Bottom cap 50 is connected to a gas source 52 via a gas line 54 and gas valve 56. Top cap 44 is similarly connected to a gas outlet 58 via a gas line 60 and valve 62. The gas lines and valves and caps 44, 50 all function to control the composition of the gas maintained within capillary 18. It is advantageous to fill the capillary with a gas containing thermonuclear fusion material such as tritium ($^3$H) and/or deuterium ($^2$H). However, it is possible to avoid the use of a special gas (air might be suitable) if a sufficiently intense discharge is delivered to the capillary. It should be understood that any impurities in the plasma will tend to reduce the thermonuclear reaction and will tend to increase the pulse requirements.

Around the capillary discharge zone are positioned optional shields 60. These shields act to absorb emitted nuclear radiation in all directions except in the desired direction 62. Shields are not required everywhere because the spacer 40 itself will act as a shield. An electrical pulse may be supplied to the apparatus of FIG. 2 in the same fashion as shown in FIG. 1 and the discharge may be similarly initiated by a laser pulse. The apparatus shown in FIG. 2 acts as a convenient and compact source of pulsed nuclear radiation, which may be used for medical treatment or for materials analysis, such as by neutron diffraction or inelastic neutron scattering.

Figure 3:
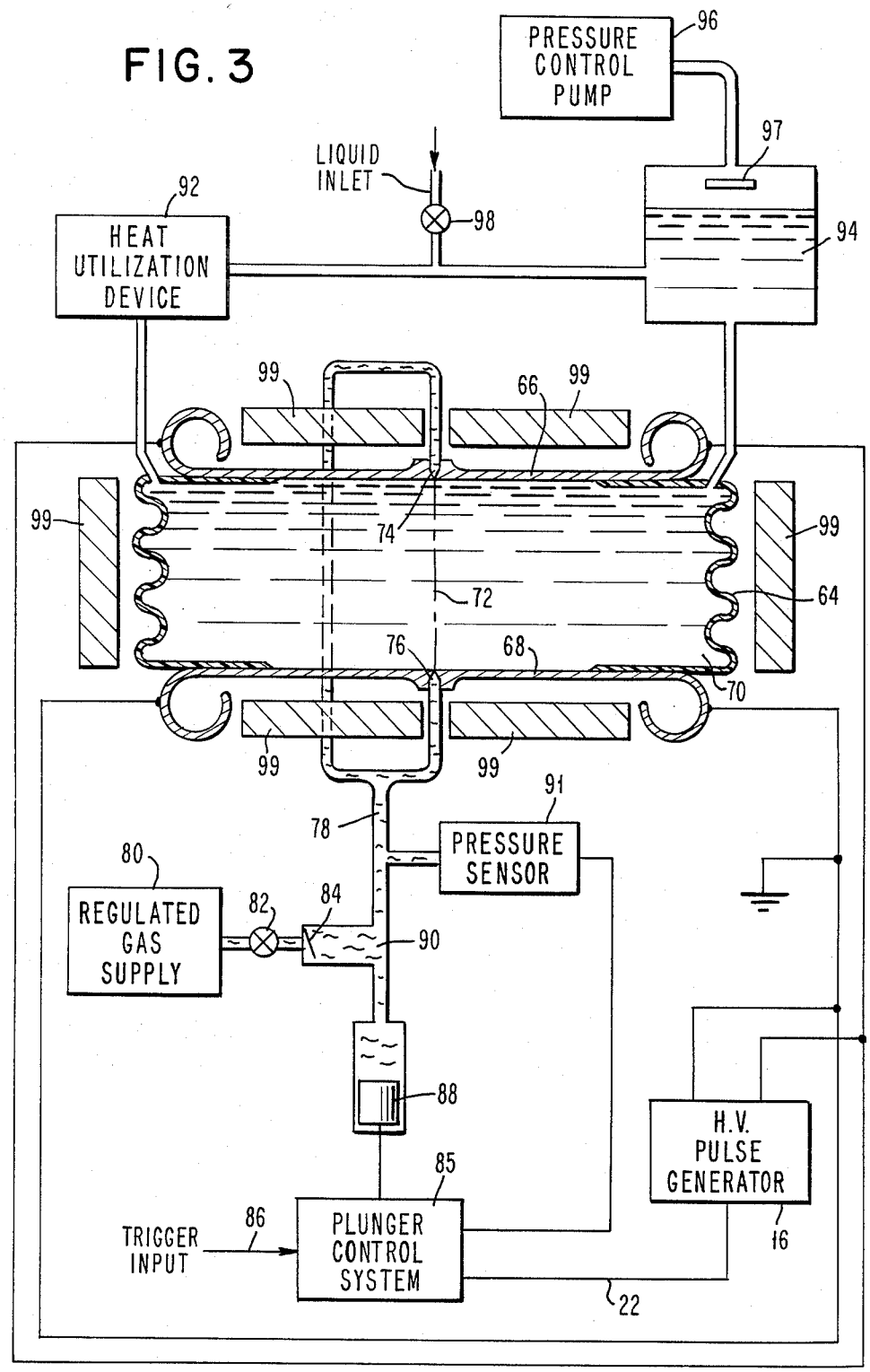
FIG. 3 illustrates another capillary discharge unit wherein the capillary is formed as a transient channel within a liquid phase material containing fusion reaction constituent(s).

Another embodiment is illustrated in FIG. 3. In this embodiment, the condensed phase material is a liquid, such as water. Outer walls 64 cooperate with discharge plates 66, 68 to contain liquid 70, which contains thermonuclear fusible material. A suitable liquid 70 is heavy water, which is a mixture of $^2$H$_2$O, $^3$H$_2$O and $^2$H$^3$HO.

A transient capillary is formed in the liquid 70 by the discharge itself. Various methods may be used to induce the discharge to form along a desired path 72. A preferred method is to form gaseous bubbles. If a train of bubbles are established within the liquid 70 leading from plate 68 to plate 66, a discharge will follow the train of bubbles. It is also possible to merely form a small bubble at both discharge plates. The discharge will then begin at the bubble at one plate and extend to the bubble at the other plate. Nozzles 74, 76 are used to form such discharge initiating bubbles. A gas tube 78 supplies gas to both nozzles from a regulated gas supply 80 via a turn-off valve 82 and a flapper valve 84. Valve 82 is normally open when a discharge is to be produced. Plunger control system 85 receives a trigger input via line 86 and initiates a sequence with the correct time delays such that the bubbles and an electrical pulse are produced at the correct times. Upon receiving a trigger input, plunger control system 85 withdraws plunger 88 so that a gas is brought into chamber 90 through flapper valve 84. Plunger 88 is then extended forcing flapper valve 84 closed and pushing the gas along line 78 toward nozzles 74, 76. Pressure sensor 91 monitors the gas pressure within gas line 78 and controls through system 85 the gas pressure produced by plunger 88. At a predetermined gas pressure, a gas bubble of a desired size will be formed at nozzles 74, 76. Plunger 88 is caused to stop extending when this predetermined pressure is reached and a trigger pulse is sent simultaneously to generator 16 via line 22.

Upon receiving a trigger input on line 22, pulse generator 16 delivers a high power pulse to plates 66 and 68. The high power pulse is delivered to the plates at preferably several locations along the outer periphery. The high power pulse propagates inward toward the capillary charging the plates substantially completely by the time the voltage rises at the center where the bubbles are located. When the voltage across the plates at the bubbles is sufficiently high, a sudden electrical discharge occurs between the plates along path 72.

The discharge forms a capillary and creates a plasma. If the discharge is sufficiently intense, and rises sufficiently quickly, the temperature within the core plasma will reach at least 60 million degrees and support a fusion reaction. The fusion reaction and the electrical discharge both heat the liquid 70. Liquid 70 is circulated from the capillary discharge region to a heat utilization device 92 and then returned to the capillary discharge region. Along the flow path is a reservoir 94, which supplies liquid 70 as needed and collects gaseous products of the discharge. The gaseous products removed by pump 96, which also controls the static (and if desired the dynamic) pressure of the liquid. A baffle 97 keeps liquid 70 from entering the pump 96. A liquid inlet valve 98 supplies liquid 70 to the system.

What is illustrated in FIG. 3 is a pulsed fusion reactor for producing heat. Shields 99 absorb neutrons escaping from the liquid 70 and may be composed of lithium, for example. Lithium shields would absorb neutrons and produce tritium, thereby acting as a breeder reactor. Production of tritium could be the primary function of this fusion reactor.

Figure 4:
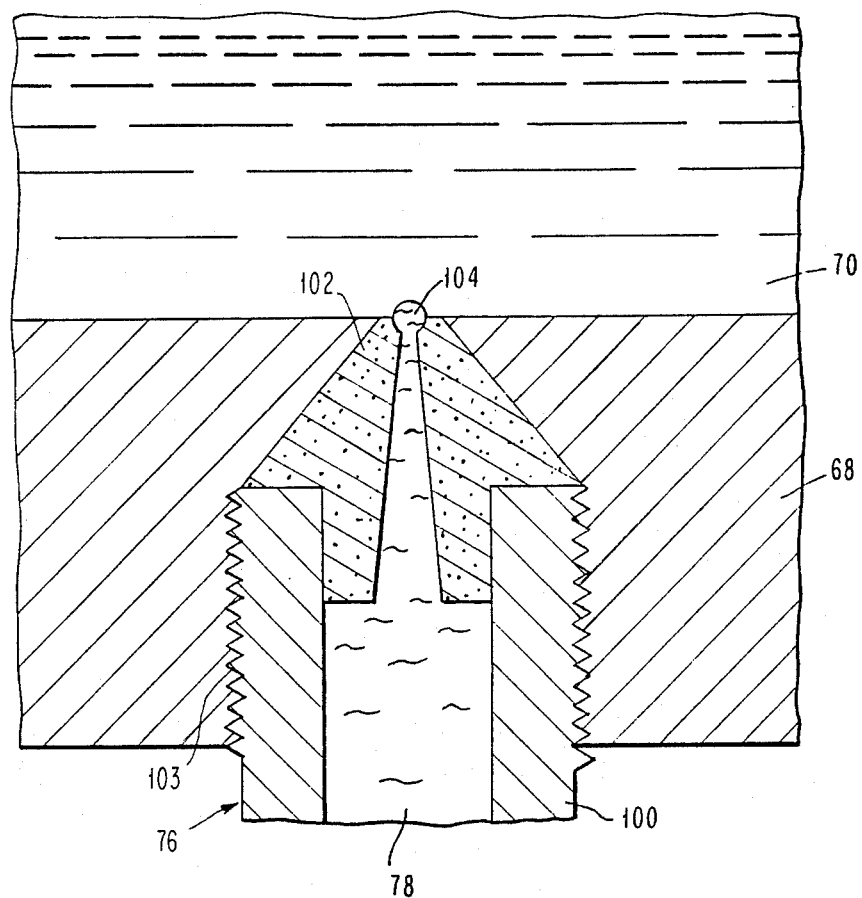
FIG. 4 is a detailed cross-sectional view of the bubble forming nozzle illustrated in FIG. 3.
Figure 4:
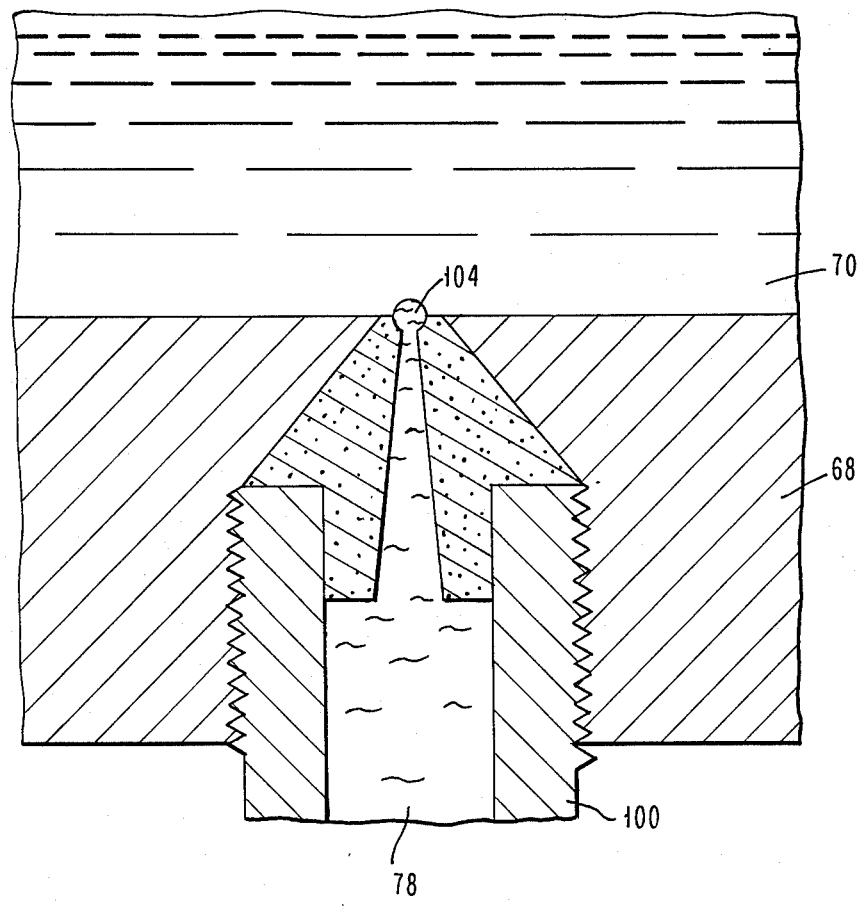

FIG. 4 shows in magnification the gas bubble forming nozzle 76. The gas carrying conduit 100 (or a fitting connected thereto) is attached to plate 68 via threads 103. Nozzle member 102 is formed of graphite and is in good electrical contact with plate 68. A bubble 104 forms as shown at a predetermined pressure.

Many changes and modifications to these embodiments will be immediately apparent to those skilled in nuclear physics and in high power pulse technology and may be made without departing from the spirit and scope of this invention, which is defined by the following claims. For example, there are many ways of initiating a discharge other than by a laser beam pulse or bubbles, and bublbes can be formed in many different ways. Bubbles may be formed along an ionization path of a high energy particle passing through a superheated liquid followed by a pressure release on the liquid, much as occurs in a hydrogen bubble chamber. Bubbles also may be formed by cavitation brought about by, for instance, flow of gassified liquid through a constricted region or, for instance, by a sudden release of pressure on the liquid in a very localized region, such as at two openings on each plate. A laser could generate an ionization path not only in a gas but also in a liquid or solid and it might alternatively initiate a discharge through a liquid or solid by forming a thermal rarefraction channel. Vortex flow in a liquid might form a capillary. In addition to laser radiation, other radiation could be used to initiate a discharge, such as for example an electron beam, ion beam, x-ray beam or gamma radiation. Breakdown through a solid could be guided by small cavities at each plate, similar to the bubble effect in a liquid. A small diameter fiber might be positioned within a liquid to guide the discharge. The fiber might be composed of fusible material or it might be a specially fabricated low density structure, for instance containing pores or gas pockets. The fiber might also be hollow thereby forming an open capillary by itself. Bubbles might be caused to form on the surface of a fiber. An acoustic wave might be used to create a rarefraction channel in a liquid or solid. Instead of providing fusible material in the form of a sleeve, fusible material might instead be evaporated within a capillary by cryogenic techniques either externally supplied or self generated by expansion of a fusible gas material while flowing through the capillary. A rarefaction channel can be produced by detonation of a chemically reactive species along a desired axis. Triggering of the detonation may be by photochemical, initiation with a laser, for example.

Having thus described my invention, what I claim as new, and desire to secure by Letters Patent is:

1. Capillary discharge apparatus, comprising:
    means for defining a capillary having walls comprising condensed phase thermonuclear fusible material and having a selected diameter D and length L such that L/D is at least 100;
    means for creating an electrical current discharge along the axis of the capillary to produce a plasma within the capillary; and
    means for actuating the electrical discharge current creating means to create a current discharge with sufficient amplitude and rise time for said selected D and L to cause a core plasma to be formed within the capillary at a temperature of at least 2 million degrees Kelvin and greater.

2. Capillary discharge apparatus as defined in claim 1 wherein the thermonuclear fusible material comprises deuterium.

3. Capillary discharge apparatus as defined in claim 1 wherein the thermonuclear fusible material comprises tritium.

4. Capillary discharge apparatus as defined in claim 1 wherein the capillary has solid phase walls.

5. Capillary discharge apparatus as defined in claim 1 wherein the capillary has liquid phase walls.

6. Capillary discharge apparatus as defined in claim 1 wherein said capillary defining means includes the electrical discharge current.

7. Capillary discharge apparatus as defined in claim 1 wherein said means for creating electrical discharge current comprises means for producing a laser pulse.

8. Capillary discharge apparatus as defined in claim 1 wherein said means for creating the electrical discharge current comprises means for creating gas bubbles in said defining means.

9. Capillary discharge apparatus as defined in claim 1 wherein said means for creating the electrical discharge current comprises two conductive plates respectively disposed at opposite ends of said capillary, and said actuating means comprises means for storing electrical energy between said two conductive plates and intiating a discharge directly from one plate to the other.

10. Capillary discharge apparatus as defined in claim 9 wherein said actuating means comprises means for causing the discharge to occur at a central region of the plate.

11. Capillary discharge apparatus as defined in claim 1 wherein:
said capillary defining means comprises means for creating a D ranging from approximately 10 micrometers to approximately 250 micrometers, and an L/D ranging from approximately 100 to approximately 1000;
said current discharge creating means comprises means for creating a current with a current rise time ranging from approximately 10 nanoseconds to approximately 200 nanoseconds, and an amplitude of at least approximately 50 kiloamps; and
said actuating means comprises means for producing a voltage ranging from approximately 10 to approximately 40 kilovolts.

12. A method of generating a transient temperature higher than 2 million degrees Kelvin, comprising the steps of:
defining a capillary having walls comprising condensed phase thermonuclear fusible material and having a selected diameter D and length L such that L/D is at least 100; and
discharging an electrical pulse through said capillary, along the axis thereof, said pulse having an amplitude and rise time matched to said selected D and L for causing a core plasma to be formed within the capillary reaching a temperature higher than 2 million degrees Kelvin.

13. The method defined in claim 12 wherein said selected D and L and said pulse amplitude and rise time are matched such that a plasma is formed by the electrical pulse discharge with a temperature reaching at least 60 million degrees Kelvin and with a density-time product of at least $10^{14}$ particle-seconds/cm$^3$.

14. A method as defined in claim 12 wherein D ranges from approximately 10 micrometers to approximately 250 micrometers, L/D ranges from approximately 100 to approximately 1000, current rise time ranges from approximately 10 nanoseconds to approximately 200 nanoseconds, the current amplitude is at least approximately 50 kiloamps and the actuating voltage ranges from approximately 10 to approximately 40 kilovolts.

15. Apparatus for producing a controlled thermonuclear fusion reaction comprising:
means for defining a capillary having walls comprising condensed phase thermonuclear fusible material and a length selected to be at least 100 times its diameter;
means for creating an electrical current discharge along the axis of the capillary to produce a plasma within the capillary; and
means for actuating the electrical discharge current creating means to create a current discharge with sufficient amplitude and rise time for said selected length and diameter to cause a core plasma to be formed within the capillary reaching a maximum temperature $T_{max}$, given by the relationship $$T_{max} \simeq (9/8D^{\frac{1}{2}})(A^{\frac{1}{2}}Z\Lambda L/D)^{\frac{1}{2}}$$

where D is the diameter of the capillary at the time maximum plasma temperature is reached, L is the length of the capillary and much greater than D, L/D is the aspect ratio of the capillary, A is the atomic weight (weighted average) of the core plasma, Z is the average ionic charge of the core plasma, $\Lambda$ is the Coulomb logarithm with a value of approximately 10, and $T_{max}$ is greater than 20 million degrees Kelvin.

16. Apparatus as in claim 15 wherein said actuating means comprises means for producing a minimum voltage V to be maintained during the discharge and given by the relationship $$\eta Y \simeq 2 \times 10^7 V^2 A/Z\Lambda(T_{max})^{\frac{1}{2}}$$

where $\eta Y$ is the density-time product in particle-seconds/cm$^3$ having a value of at least $10^{14}$, and V is in volts.

17. Apparatus as in claim 16 wherein V ranges from approximately 10 kilovolts to approximately 40 kilovolts.

18. Apparatus as in claim 16 wherein said current discharge creating means comprises means for creating a current with an amplitude I given by the relationship $$I = (\pi/4)(V/L)D^2\sigma$$

where $\sigma$ is the conductivity of the plasma and given by the relationship $$\sigma \simeq 10^2(T_{max})^{3/2}/Z\Lambda.$$

19. Apparatus as in claim 18 wherein $I \geq 50$ kiloamps.

20. Apparatus as in claim 18 wherein said current discharge creating means comprises means for creating a current with a rise time $dI/dt \simeq 10^9 V(volts)/3L(cm)$ in amperes/sec.

21. Apparatus as in claim 15 wherein:
said means for creating an electrical current discharge comprises means for producing a current I;
said means for actuating the electrical discharge current creating means comprises means for producing a voltage V; and
said capillary defining means comprises means defining a capillary with a diameter D and a length L and with wall material of a density $\rho$ satisfying the relationship:

$$\rho(gms/cm^3) > 1.3V^2(volts) A^2/10^{10}T_{max}^2(ev)D^2 (cm),$$

and wherein:
I V/$\pi$DL > $10^9$ watts/cm$^2$.

22. Apparatus as in claim 21 wherein said means for creating an electrical current discharge comprises means for producing a current pulse with a duration lasting at least 300 $(A/T_{max})^{\frac{1}{2}}$ nanoseconds.

23. Apparatus as in claim 22 wherein the pulse duration is approximately 1000 nanoseconds.

24. Apparatus as in claim 22 wherein said thermonuclear fusible material is such as to result in a deuterium-tritium core plasma and V=40,000 volts. I=88,000 amperes, L=1.54 centimeters, D=11 $\mu$m, the current rise time=$10^{-8}$ sec. and the pulse duration=$10^{-8}$.

25. Apparatus as in claim 22 wherein V=12,500 volts, I=74,000 amperes, L=1.5 centimeters, E=67 $\mu$m, the current rise time=$2.7 \times 10^{-8}$ and the pulse duration=$10^{-8}$.

26. Apparatus as in claim 22 wherein V=130,000 volts, I=280,000 amperes, D=35 μm, L=15.4 centimeters, the current rise time=$10^{-7}$ seconds, and the pulse duration is $10^{-7}$ seconds.

27. Method for producing a plasma with a temperature of at least 10 million degrees Kelvin and above, comprising the steps of:

defining a capillary having walls comprising condensed phase thermonuclear fusible material and having a selected diameter D and length L such that L/D is at least 100; and creating an electrical current discharge along the axis of the capillary having sufficient amplitude and rise time for said selected D and L for causing a core plasma to be formed within the capillary at a temperature $T_{max}$ of at least 10 million degrees Kelvin and above, wherein $$T_{max} \simeq (9/8\ D^{\frac{1}{2}})(A^{\frac{1}{2}}Z\Lambda L/D)^{\frac{1}{2}}$$

where D is the diameter of the capillary at the time maximum plasma temperature is reached, L is the length of the capillary and much greater than D, L/D is the aspect ratio of the capillary, A is the atomic weight (weighted average) of the core plasma, Z is the average ionic charge of the core plasma, $\Lambda$ is the Coulomb logarithm with a value of approximately 10;

the minimum voltage V producing the discharge and maintained during the discharge is given by the relationship $$\eta Y \simeq 2 \times 10^7 V^2 A/Z\Lambda(T_{max})^{\frac{1}{2}}$$

where $\eta Y$ is the density-time product in particle-seconds/cm$^3$ having a value of at least $10^{14}$, and V is in volts; and the discharge current has a rise time dI/dt$\simeq 10^9$ V(volts)/3L(cm) in amperes/sec., and an amplitude I given by the relationship $$I=(\pi/4)\ (V/L)\ D^2\sigma$$

where $\sigma$ is the conductivity of the plasma and given by the relationship $$\sigma \simeq 10^2(T_{max})^{3/2}/Z\ \Lambda.$$

28. Method as in claim 27 wherein said capillary is defined with a diameter D and a length L and with wall material of a density $\sigma$ satisfying the relationship:

$$\rho(gms/cm^3) > 1.3 V^2(volts)A^2/10^{10}T_{max}^2(ev)D^2\ (cm).$$

and wherein:

$$IV/\pi DL > 10^9\ watts/cm^2.$$

29. Method as in claim 28 wherein said electrical current discharge comprises a current pulse with a duration lasting at least 300 $(A/T_{max})^{\frac{1}{2}}$ nanoseconds.

30. System for producing a plasma with a temperature of at least 10 million degrees Kelvin and above, comprising:

means for defining a capillary having walls comprising condensed phase thermonuclear fusible material and having a selected diameter D and length L such that L/D is at least 100; and means for creating an electrical current discharge along the axis of the capillary having sufficient amplitude and rise time for said selected D and L to cause a core plasma to be formed within the capillary at a temperature $T_{max}$ of at least 10 million degrees Kelvin, and above, wherein:

$$T_{max} \simeq (9/8\ D^{\frac{1}{2}})(A^{\frac{1}{2}}Z\Lambda L/D)^{\frac{1}{2}}$$

where D is the diameter of the capillary at the time maximum plasma temperature is reached, L is the length of the capillary and much greater than D, L/D is the aspect ratio of the capillary, A is the atomic weight (weighted average) of the core plasma, Z is the average ionic charge of the core plasma, $\Lambda$ is the Coulomb logarithm with a value of approximately 10; and said discharge creating means comprises:

means for producing a minimum voltage V to be maintained during the discharge and given by the relationship:

$$\eta Y \simeq 2 \times 10^7 V^2 A/Z\Lambda(T_{max})^{\frac{1}{2}}$$

where $\eta Y$ is the density-time product in particle-seconds/cm$^3$ having a value of at least $10^{14}$, and V is in volts; means for creating a current with an amplitude I given by the relationship:

$$I=(\pi/4)(V/L)D^2\ \sigma$$

where $\sigma$ is the conductivity of the plasma and given by the relationship $$\sigma \simeq 10^2(T_{max})^{3/2}/Z\ \Lambda$$

and means for creating a current with a rise time dI/dt$\simeq 10^9$ V(volts)/3L(cm) in amperes/sec.

31. System as in claim 30 wherein said capillary defining means comprises means defining a capillary with a diameter D and a length L and with wall material of a density $\rho$ satisfying the relationship:

$$\rho(gms/cm^3) > 1.3\ V^2(volts)A^2/10^{10}T_{max}^2(ev)D^2\ (cm),$$

and wherein:

$$IV/\pi DL > 10^9\ watts/cm^2.$$

32. System as in claim 31 wherein said means for creating an electrical current discharge comprises means for producing a current pulse with a duration lasting at least 300 $(A/T_{max})^{\frac{1}{2}}$ nanoseconds.

* * * * *